Patented Aug. 25, 1942

2,293,969

UNITED STATES PATENT OFFICE 2,293,969

MANUFACTURE OF CYANOACRYLIC ACID ESTERS

John William Croom Crawford, Frodsham, and Nancy McLeish and Thomas Kenneth Wood, Runcorn, England, assignors to Imperial Chemical Industries Limited, a corporation of Great Britain No Drawing. Application April 19, 1941, Serial No. 389,358. In Great Britain May 23, 1940

10 Claims. (Cl. 260—464)

This invention relates to the manufacture of novel organic compounds, and more particularly to the manufacture of beta-cyano-acrylic acid esters.

According to the present invention beta-cyanoacrylic acid esters are obtained by reacting an ester of alpha-chloroacrylic acid with a cyanide of an alkali metal or an alkaline earth metal at a temperature which does not greatly exceed room temperature, and in the presence of water and a water-miscible organic solvent for the alpha-chloroacrylic acid ester. Suitably the reaction is effected at temperatures between 0° C. and 30° C.

In one method of carrying out our invention sodium cyanide is dissolved in aqueous acetone containing, for example, 50% to 70% of acetone, and the mixture is gradually added to the alpha-chloroacrylic acid ester with stirring. Considerable evolution of heat occurs and cooling is necessary to prevent too great a rise in temperature; the additions of the ester are regulated so as to assist the maintenance of the desirable reaction temperature, which is suitably about 20° to 25° C. When an amount of sodium cyanide has been added approximately equivalent to the amount of ester used, no further additions are made, but stirring is continued until reaction is complete, as judged by the evolution of heat. The product can then be obtained by pouring the reaction mixture into water, when the product forms a separate layer which can be isolated and purified, as by fractional distillation. Alternatively the ester may be extracted from the reaction liquor with a solvent such as benzene.

Instead of the acetone, other organic solvents for the alpha-chloroacrylic acid esters miscible with water may be used, particularly the lower aliphatic alcohols, methanol, ethanol, propanol and isopropanol. The first of these, in particular, has been found to be valuable in carrying out our invention.

The amount of solvent should be sufficient to dissolve the chloroacrylic acid ester, and similarly the water mixed with the solvent should be sufficient to bring the cyanide which is added into solution. Amounts of water greatly exceeding this are not desirable, since the presence of water under reaction conditions tends to produce hydrolysis. The amount of water employed should therefore not greatly exceed that necessary to dissolve the cyanide. When the solvent is acetone, for example, amounts of water between 30% and 40% by weight of the acetone are suitable, while in the case of methanol amounts up to 3 times the weight of the methanol may be used though we prefer to use approximately equal weights of the two.

We have also found that it is desirable to prevent the reaction liquor from becoming too strongly alkaline during the reaction through decomposition of the cyanide to hydroxide, and thereby increasing the loss of ester by hydrolysis. This may be done by buffering the liquor to a weakly alkaline condition, suitably by adding an alkali metal bicarbonate or borate with the aqueous liquid.

It has also been found that it is advantageous to have present in the reaction mixture an antipolymerising stabilizer for the chloroacrylate, as for example, hydroquinone or preferably aniline.

Although, as described above, the mixture of cyanide, water, and organic solvent may be added gradually to the ester, the cyanide may instead be dissolved in the water and the ester in the solvent, and the former solution added to the latter gradually with cooling. Similarly, instead of using sodium cyanide, potassium cyanide, calcium cyanide or magnesium cyanide may be used; the use of the latter alkaline earth metal cyanides has the advantage that the large increase in alkalinity during the reaction which accompanies the use of the alkali metal cyanides is avoided. When an alkaline earth metal cyanide is used it may be added to the other reactants as such, or it may be formed in situ by the reaction of a chloride, sulphate or other soluble salt of the alkaline earth metal with an alkali metal cyanide. Thus an aqueous calcium chloride solution may be mixed with the alpha-chloroacrylate and the solvent, and the reaction brought about by adding concentrated sodium cyanide solution containing the equivalent amount of cyanide gradually, while controlling the temperature.

The production of beta-cyanoacrylates from alpha-chloroacrylates by the method of the present invention was not to be expected, since a beta-substituted derivative is obtained from an alpha-substituted one. The constitution of the products is demonstrated, however, by the consideration that on hydrolysis fumaric acid and not methylene malonic acid results. Two stereoisomers of the beta- cyanoacrylate should theoretically be possible, and we have found that both are produced by our invention and may be isolated by fractional distillation of a mixture of the two under reduced pressure, followed by crystallisation of the fractions obtained. Thus from methyl alpha-chloroacrylate two fractions are so obtained having the empirical composition and molecular weight of methyl beta-cyanoacrylate, and both yield fumaric acid on hydrolysis. The melting points of the two fractions are slightly different and there is a difference in the boiling points. It may thus be deduced that one of these is the cis-form and the other the trans-form. In general, of two geometric isomers the one with the lower dipole moment has the lower boiling point (see Phys. Review, 1934, 46, 65), and since because both the cyano group and the carbomethoxy group are electronegative, the dipole moment of the trans-form may be expected to be less than that of the cis-form, it can be taken that the lower boiling isomer is the trans-form.

Various esters of alpha-chloroacrylic acid may be treated according to our invention, e. g. alkyl, aryl, and aralkyl esters, but the invention is of particular value as applied to the lower alkyl esters, i. e. methyl, ethyl, propyl and isopropyl esters.

The following examples illustrate but do not limit our invention, all parts being by weight:

*Example I*

A solution of 76 parts of sodium cyanide in 140 parts of water was gradually added to a solution of 180 parts of methyl alpha-chloroacrylate in 120 parts of acetone over a period of two hours; during this period and for a further three hours the reaction mixture was stirred and cooled to maintain its temperature below 28° C. At the end of this time there was no further evolution of heat, and reaction was thus judged to be complete.

On standing, the mixture separated into two layers and the lower one containing the acetone was separated off and submitted to fractional distillation at a pressure of 100 mm. of mercury. Acetone, water and methyl alpha-chloroacrylate distilled off first, and then two fractions were obtained as follows:

|  | Parts |
|---|---|
| 1. 105–120°/100 mm | 45.5 |
| 2. 140–145°/100 mm | 7.5 |

On washing the first fraction with water it crystallised, and on recrystallising from aqueous methanol, white crystalline needles of M. P. 34° C. and B. P. 115°–116° C./100 mm. were obtained which analysed as follows:

|  | C | H | N | Molecular weight |
|---|---|---|---|---|
|  | Per cent | Per cent | Per cent |  |
| Found | 54.4 | 4.6 | 12.4 | 109 |
| Calculated for methyl cyanoacrylate | 54.1 | 4.5 | 12.6 | 111 |

The second fraction was similarly recrystallised and gave white needles melting at 36° C. and boiling at 143°–145° C./100 mm., and analysing as follows:

| Per cent | Per cent | Per cent |
|---|---|---|
| C 53.5 | H 4.4 | N 12.8 |

On heating with aqueous methyl alcoholic hydrogen chloride both fractions yielded methyl fumarate. It was thus deduced that the two cyanogen products were the cis- and trans-modifications of methyl beta-cyanoacrylate, inversion of the former occurring during the treatment with aqueous alcoholic hydrogen chloride.

*Example II*

A solution of 26 parts of sodium cyanide in 60 parts of water was slowly added to a solution of 60 parts of methyl alpha-chloroacrylate in 40 parts of methanol while stirring the mixture; reaction immediately commenced and the vessel was kept cool by immersion in cold water to prevent reaction becoming violent. When all the cyanide solution had been added stirring was continued for a further half hour; reaction then appeared to be complete. During the reaction a white precipitate formed and at the end of the reaction this precipitate was redissolved by adding more water. A lower, non-aqueous layer then formed which was separated off, dried over sodium sulphate and distilled at a pressure of 24 mm. In addition to some material distilling in the range 40°–75° C. and some boiling above 80° C., a fraction weighing 10 parts distilled over between 78° and 79° C. and was collected separately. This fraction crystallised to a white solid which was not readily soluble in water or cold petrol ether. Its aqueous solution was not acid to methyl red. The solid was recrystallised from hot petrol ether and analysed as follows:

|  | C | H | N |
|---|---|---|---|
|  | Per cent | Per cent | Per cent |
| Found | 54.4 | 4.5 | 12.65 |
| Required for methyl cyanoacrylate | 54.05 | 4.5 | 12 |

*Example III*

A solution of 48 parts of anhydrous magnesium chloride in 100 parts of water was mixed with 80 parts of methanol, 120 parts of methyl alpha-chloroacrylate and 1 part of aniline in a cooled vessel. A solution of 49 parts of sodium cyanide in 90 parts of water was gradually run in over a period of 12 minutes; the mixture was stirred during the additions and the cooling was regulated to prevent the temperature rising above 32° C. Stirring was continued for a further period of 2½ hours, by which time the temperature had fallen to 20° C. The reaction mixture was then poured into water and extracted with benzene. The benzene extract was then distilled at a pressure of 100 mms. of mercury.

Fractions were obtained as follows:

| Fraction I | 39°–41° (benzene) |
|---|---|
| Fraction II | 70°–80°—60 parts |
| Fraction III | 110°–120°—28 parts |
| Fraction IV | 130°–135°—16 parts |

The fraction III was trans-methyl beta-cyanoacrylate and fraction IV a mixture of the cis- and transforms of methyl beta-cyanoacrylate.

*Example IV*

120 parts of methyl alpha-chloroacrylate were mixed with 1 part of aniline, 80 parts of methanol, 84 parts of sodium bicarbonate and 100 parts of water. The mixture was stirred and cooled while a solution of 49 parts of sodium cyanide in 90 parts of water was gradually added over a period of an hour, the temperature being prevented from rising above 30° C. When all the cyanide solution had been added, stirring and cooling were continued for a further four hours. The reaction liquor was then diluted with water and extracted with ether. The ether was evaporated off from the extract at atmospheric pressure and the residue was fractionated at 100 mm. pressure of mercury. On fractionating the remainder at 100 mm. pressure water and unchanged methyl alpha-chloroacrylate distilled over below 90° C. and two fractions were obtained boiling as follows:

| | Parts |
|---|---|
| 114°–116° C | 28 |
| 125°–130° C | 17 |

The 114°–116° C. fraction was trans-methyl beta-cyanoacrylate in the form of a yellow crystalline solid and the other fraction was a liquid mixture of the cis- and trans-forms.

*Example V*

120 parts of methyl alpha-chloracrylate were mixed with 1 part of aniline, 80 parts of methanol, 100 parts of water and 100 parts of potassium bicarbonate. The mixture was stirred and cooled while a solution of 65 parts of potassium cyanide in 100 parts of water was gradually added over a period of half an hour, keeping the temperature below 30° C. Stirring was continued for a further 4½ hours. The reaction liquor was then diluted with 400 parts of water and extracted with ether; the ether solution was washed with water and the ether then distilled off at atmospheric pressure.

On fractionating the remainder at 100 mm. pressure, water and unchanged chloroacrylate distilled over below 80° C. and two fractions were obtained as follows:

| | Parts |
|---|---|
| 112°–114° C | 35 |
| 125°–130° C | 3 |

The 112°–114° C. fraction was trans-methyl beta-cyanoacrylate in the form of a yellow crystalline solid, and the other was a liquid mixture of the cis- and trans-forms.

We claim:

1. A process for the manufacture of beta-cyanoacrylic acid esters which includes the steps of reacting a compound selected from the group consisting of alkali metal cyanides and alkaline earth metal cyanides with an ester of alpha-chloroacrylic acid at a temperature which does not greatly exceed room temperature, and in the presence of water and a water-miscible organic solvent for the alpha-chloroacrylic acid ester.

2. A process for the manufacture of beta-cyanoacrylic acid esters which includes the steps of reacting a compound selected from the group consisting of alkali metal cyanides and alkaline earth metal cyanides with an ester of alpha-chloroacrylic acid at a temperature between 0° C. and 30° C. and in the presence of water and a water-miscible organic solvent for the alpha-chloroacrylic acid ester.

3. A process for the manufacture of beta-cyanoacrylic acid esters which includes the steps of reacting a compound selected from the group consisting of alkali metal cyanides and alkaline earth metal cyanides with an ester of alpha-chloroacrylic acid at a temperature which does not greatly exceed room temperature and in the presence of water and an amount of a water-miscible organic solvent for the alpha-chloroacrylic acid ester which is at least equal to the amount of water.

4. A process for the manufactuer of beta-cyanoacrylic acid esters which includes the steps of reacting a compound selected from the group consisting of alkali metal cyanides and alkaline earth metal cyanides with an ester of alpha-chloroacrylic acid at a temperature which does not greatly exceed room temperature, said reaction being carried out in the presence of a water-miscible organic solvent for the alpha-chloroacrylic acid ester and of an aqueous solution of a compound selected from the group consisting of the alkali metal bicarbonates and the alkali metal borates.

5. A process for the manufacture of beta-cyanoacrylic acid esters which includes the step of adding to a mixture of an ester of alpha-chloroacrylic acid with water and a water-miscible organic solvent for the alpha-chloroacrylic acid ester a compound selected from the group consisting of alkali metal cyanides and alkaline earth metal cyanides, while maintaining the mixture at a temperature not greatly exceeding room temperature.

6. A process according to claim 5 in which the temperature of the mixture is maintained between 0° C. and 30° C.

7. A process according to claim 5, in which the compound selected from the group consisting of alkali metal cyanides and alkaline earth metal cyanides is added as a concentrated aqueous solution.

8. A process for the manufacture of beta-cyanoacrylic acid esters which includes the step of adding an alkali metal cyanide to a mixture of an ester of alpha-chloroacrylic acid with an aqueous solution of a water-soluble alkaline earth metal salt and a water-miscible organic solvent for the alpha-chloroacrylic acid ester while maintaining the reaction mixture at a temperature not greatly different from room temperature.

9. A process according to claim 8 in which the temperature of the reaction mixture is maintained between 0° C. and 30° C.

10. A process according to claim 8 in which the alkali metal cyanide is added as a concentrated aqueous solution.

JOHN WILLIAM CROOM CRAWFORD.
NANCY McLEISH.
THOMAS KENNETH WOOD.